United States Patent Office.

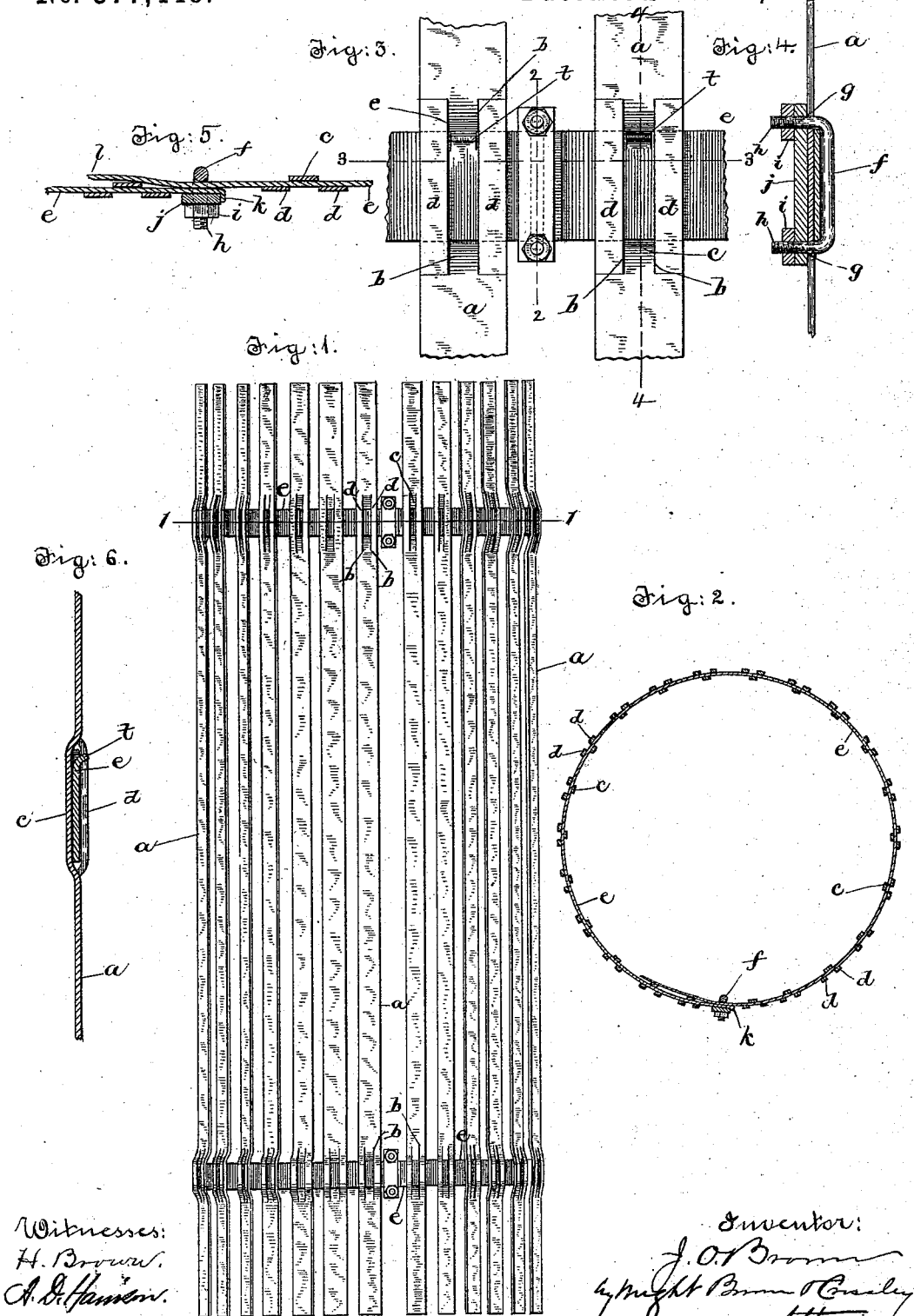

JAMES O. BROWN, OF BOSTON, MASSACHUSETTS, ASSIGNOR OF ONE-HALF TO JAMES S. NEWELL, OF SAME PLACE.

TREE-PROTECTOR.

SPECIFICATION forming part of Letters Patent No. 377,448, dated February 7, 1888.

Application filed December 13, 1886. Serial No. 221,443. (No model.)

*To all whom it may concern:*

Be it known that I, JAMES O. BROWN, of Boston, in the county of Suffolk and State of Massachusetts, have invented certain new and useful Improvements in Tree - Protectors, of which the following is a specification.

My invention relates to tree-protectors, and especially to that class of such devices calculated to closely surround and be supported by the tree to prevent horses and other animals from gnawing the same, or to prevent them from being otherwise injured, and in which provision is made for the growth and expansion of the body of the tree without hinderance from or detrimental effects by the protector.

It is the object of my invention to provide an improved tree-protector in which the parts may be readily assembled and adjusted to suit a tree of any size, and which may be arranged so as to be held or supported with security on the tree and yet yield with all requisite freedom to the growth or expansion of the tree, making the contrivance at the same time simple in construction, cheap of manufacture, and convenient for manipulation and transportation.

To the foregoing ends my invention consists in the improved tree-protector, which I will now proceed to describe, so that others skilled in the art may be able to make and use the same, the invention being particularly pointed out in the claims hereto appended.

Of the accompanying drawings, forming a part of this specification, and to which reference is made, Figure 1 represents a side view of a tree-protector embodying my invention. Fig. 2 is a horizontal section thereof on the line 1 1, Fig. 1. Fig. 3 represents in side view a detail drawn to an enlarged scale. Fig. 4 represents a section on the line 2 2, Fig. 3. Fig. 5 represents a section on the line 3 3, Fig. 3. Fig. 6 represents a section on line 4 4, Fig. 3.

Similar letters of reference indicate similar parts in all of the figures.

In the drawings, $a$ represents slats or strips of metal adapted to surround and extend parallel with the trunk of the tree, each of which strips is cut or slitted, as at $b\ b$, at suitable points from its ends, so as to permit the portion of metal, $c$, between such slits to be bent or pressed out slightly in one direction and the portions of metal, $d$, at the sides of such portion $c$ to be pressed in the opposite direction, forming loops, which permit the strips to be strung upon hoops $e\ e$, all as clearly represented in the drawings.

In operation the slats $a$ are strung upon the hoops $e$ at suitable distances apart and in number sufficient to surround the tree which it is desired to protect, and the ends of the hoops are secured together in such manner as to preferably sustain the slats thereon, and yet permit the hoop to yield continuously as the tree expands by growth. This latter result is accomplished by providing what I term a "buckle," consisting of a U-shaped part or loop, $f$, having its ends $g$ screw-threaded, as at $h$, adapting them to receive the nuts $i$, screwed thereupon and against the link or part $j$, previously slipped upon the ends $g$, and passing one end of the hoop $e$ through the friction buckle or clasp—that is, between the loop $f$ and link $j$—and bending a portion of the extreme end of the hoop at substantially right angles with its body part, as at $k$, Figs. 2 and 5, so as to embrace a side of the link $j$. The other end, $l$, of the hoop is passed through and a suitable distance beyond the buckle between the loop $f$ and the other end of the hoop, and the nuts $i$ are turned up against the link $j$, so as to hold the two ends of the hoop in the buckle with sufficient frictional force to maintain the slats $a$ in position on the tree, but at the same time permit the end $l$ to slip through the buckle between the loop part $f$ and link $j$ as the tree expands by growth, in a manner that will be readily understood by those skilled in the art.

By the improved means described a tree-protector can readily be made up from the slats $a$ and hoops $e$ to suit a tree of any size, the parts be easily and quickly secured in position, and the desired provision for the growth of the tree secured, while at the same time the contrivance is made simple in construction and cheap of manufacture.

I prefer to cut into one edge of each hoop $e$ to form tongues $t$, of such width that they may be bent outwardly into the slots or openings between the parts $d\ d$ of the slats to prevent the slats from slipping laterally on the hoops, said tongues being formed at the proper intervals and bent out after the slats have been moved to their proper places on the hoops. (See Figs. 3 and 4.)

What I claim is—

1. In a tree-protector, the combination of hoops having overlapping ends, clamps which hold said overlapping ends by friction and permit them to be moved continuously upon each other by the pressure caused by the expansion of the tree, and slats secured to said hoops, as set forth.

2. In a tree-protector, the combination of the metallic slats $a$, having loops formed therein, the hoops $e$, passing through the loops of the slats, and a frictional buckle or clasp, substantially as described, whereby the ends of the hoops are frictionally held together with sufficient force to maintain the protector in position on the tree, but permit it to be continuously expanded or enlarged by the growth of the tree.

3. In a tree-protector, the combination of the hoop $e$, having one end provided with a bend, $k$, a friction clamp or buckle which bears against said bend and holds the overlapping ends of the hoop in frictional contact with each other, whereby the tree is enabled by its growth to continuously enlarge the hoop, and a series of slats engaged with the hoop, as set forth.

4. In a tree-protector, the combination, with the hoop $e$, having the extremity of one end provided with the bend $k$, of the buckle consisting of the loop $f$, link $j$, and nuts $i$, as set forth.

5. The combination of the slats $a$, having loops formed therein, hoop $e$, having one end thereof provided with the bend $k$, and a buckle consisting of the loop $f$, link $j$, and nuts $i$, as set forth.

6. The combination of the tree-encircling hoops cut to form tongues $t$ on their edges and the slats slotted to receive said hoops, the tongues $t$ being bent into the slots of the slats to prevent lateral displacement of the latter, as set forth.

In testimony whereof I have signed my name to this specification, in the presence of two subscribing witnesses, this 16th day of June, 1886.

JAMES O. BROWN.

Witnesses:
ARTHUR W. CROSSLEY,
A. D. HARRISON.